United States Patent [19]

Andresen, Jr.

[11] 4,245,508
[45] Jan. 20, 1981

[54] PRESSURE INDICATOR

[75] Inventor: John H. Andresen, Jr., Georgetown, Cayman Islands

[73] Assignee: Intercontinental Dynamics Corporation, Englewood, N.J.

[21] Appl. No.: 68,642

[22] Filed: Aug. 22, 1979

[51] Int. Cl.³ ............................................. G01L 7/12
[52] U.S. Cl. ....................................... 73/386; 73/729
[58] Field of Search ......................... 73/386, 387, 729

[56] References Cited

U.S. PATENT DOCUMENTS

| | | | |
|---|---|---|---|
| 2,162,308 | 6/1939 | Jenny | 73/729 X |
| 2,366,566 | 1/1945 | Shivers | 73/386 |
| 2,689,480 | 9/1954 | Angst | 73/387 |
| 3,062,053 | 11/1962 | Weber | 73/729 X |
| 3,083,343 | 3/1963 | Le Febvre | 73/386 X |
| 3,495,462 | 2/1970 | Knapp | 73/387 X |
| 3,631,435 | 12/1971 | Elenbass | 73/387 X |

Primary Examiner—Daniel M. Yasich
Attorney, Agent, or Firm—Gottlieb, Rackman & Reisman

[57] ABSTRACT

This invention relates to pressure indicators, and more particularly to an improved pressure indicator whose use is especially advantageous in sensitive pressure altimeters in which high resolution and low friction are important.

3 Claims, 5 Drawing Figures

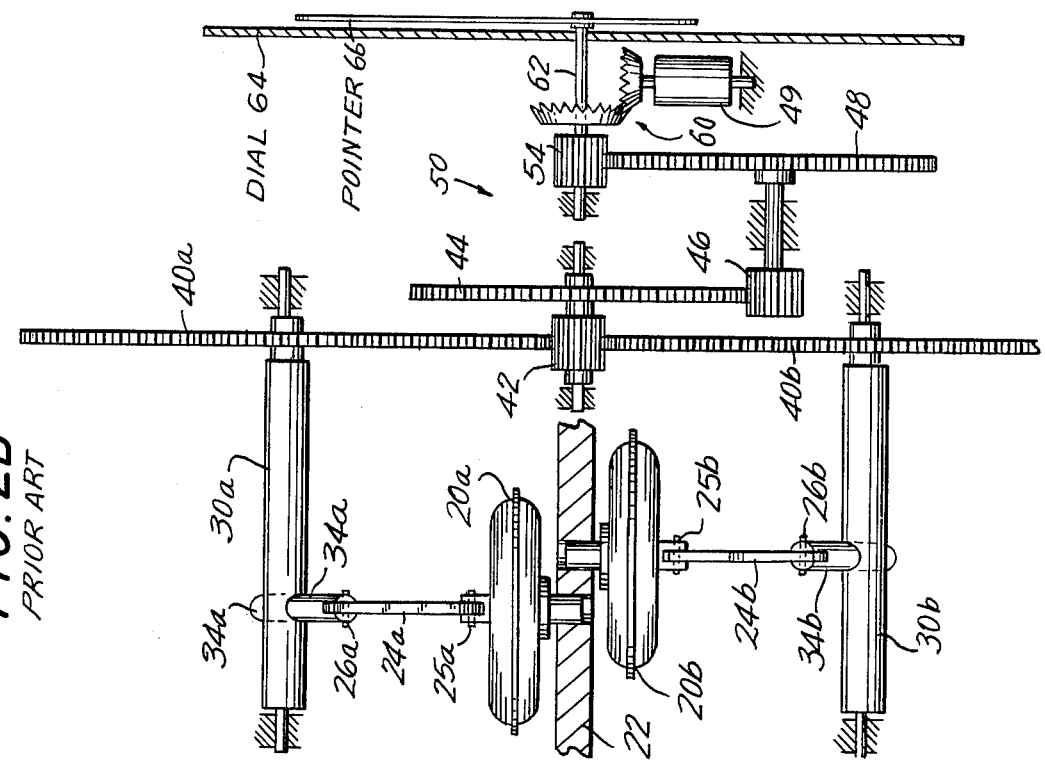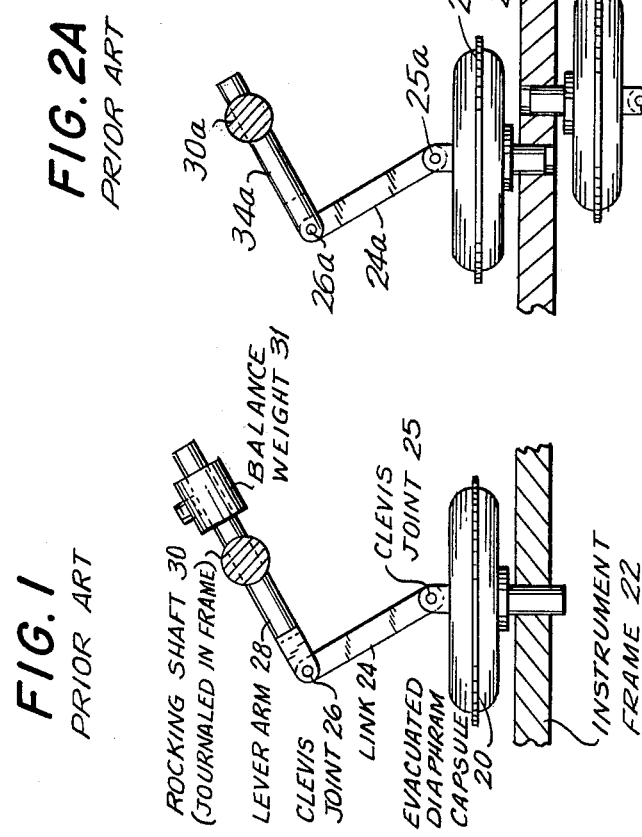

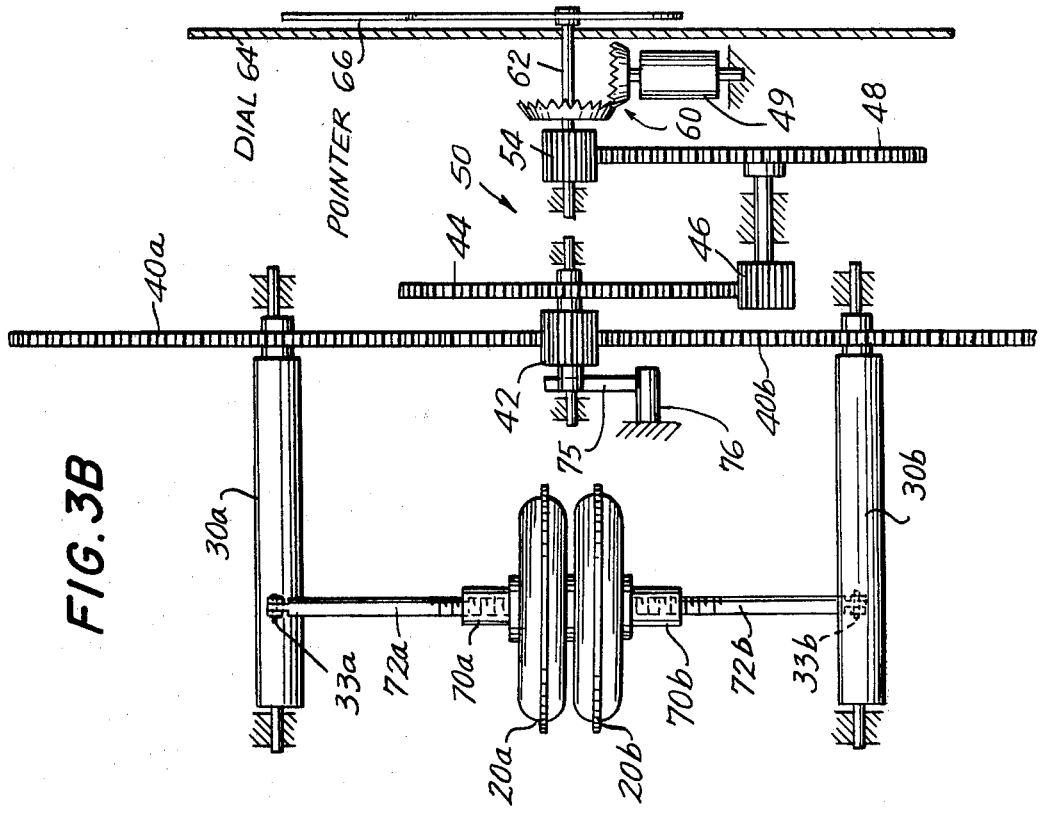
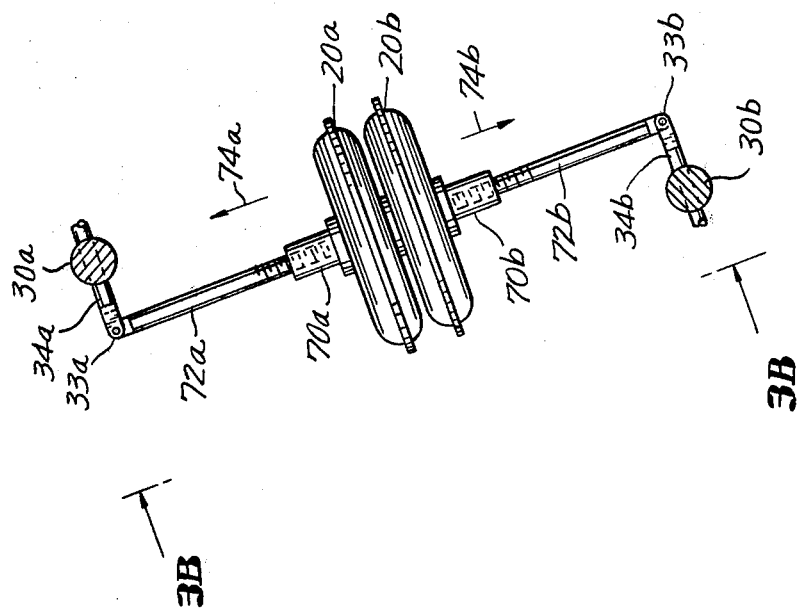

PRESSURE INDICATOR

Aircraft which operate at high altitudes require altimeters capable of responding with great accuracy to altitude changes within a broad range. U.S. Pat. No. 2,689,480 issued to Walter Angst on Sept. 21, 1954, and entitled "Sensitive Wide Range Altimeter", discloses an altimeter whose basic design now enjoys widespread use. Earlier absolute pressure gauges and altimeters employed evacuated diaphragm capsules and link and lever mechanisms for rotating a rocking shaft geared to a pointer. Angst proposed the use of two evacuated capsules, each mounted to the instrument frame and linked to a respective rocking shaft; the two rocking shafts carried gear sectors which mated with a single gear pinion, which in turn was geared to a pointer. With an Angst-type arrangement, the two rocking shaft torques are paralleled as the capsules expand or contract. The mechanism is inherently balanced and thus insensitive to gravity orientation and acceleration forces.

In such an altimeter, each rocking shaft is separately calibrated with the opposite one disconnected. Then both are connected to achieve a calibration which is approximately the average value of the two individual calibrations. If the two sides are not exactly the same, i.e., they do not track each other perfectly, one side opposes the other to provide an average by putting extra load on the sector and pinion teeth, thus adding extra friction.

It is an object of my invention to increase the effective torque from a given size capsule and reduce friction in an Angst type altimeter.

It is another object of my invention to provide such an altimeter for which only a single calibration is required (rather than two calibrations).

Briefly, in accordance with the principles of my invention, if two capsules are used, neither is attached to the frame. No matter how many capsules are used (even one is possible), they are mounted within a single rigid "floating" link. This link applies torques at its two ends to the two rocking shafts. There is no added friction due to the two rocking shaft/gear trains not tracking each other, and because the capsules do not exert lateral forces on connected links, maximum torques are applied to the two rocking shafts.

Further objects, features and advantages of my invention will become apparent upon consideration of the following detailed description in conjunction with the drawing, in which:

FIG. 1 depicts a portion of a prior art pressure indicator utilized prior to the Angst design;

FIGS. 2A and 2B depict front and side views of a prior art Angst-type pressure indicator; and FIG. 3A depicts a side view of the illustrative embodiment of my invention, with FIG. 3B being a view taken along the line 3B—3B of FIG. 3A.

Conventional absolute pressure gauges and altimeters employ evacuated diaphragm capsules with link and lever mechanisms, as shown in FIG. 1. Capsule 20 is mounted to the instrument frame 22. By means of clevis joints 25 and 26, link 24 and lever arm 28 rocking shaft 30 is rotated as the capsule expands and contracts. The rocking shaft is journaled in the frame and an adjustable weight 31 is provided to balance the mechanism. A gear train (not shown) translates rotation of the rocking shaft into a dial display. The axial portion of capsule 20 and the length of lever arm 28 are usually adjustable to provide a limited means of calibrating the rotation of rocking shaft 30 to the desired function of absolute pressure which is displayed. Some mechanisms also provide for lateral adjustment of capsule 20 and for adjustment of the length of link 24.

In the Angst-type arrangement of FIGS. 2A and 2B, two capsules 20a and 20b are mounted to frame 22. The capsules are connected by links, clevis joints and lever arms (25a, 24a, 26a, 34a, 25b, 24b, 26b, 34b) to rocking shafts 30a and 30b, respectively. The rocking shafts carry gear sectors 40a and 40b. These gear sectors mate with a single gear pinion 42 which transmits the combined torques by gear train 44, 46, 48, 54 and shaft 62 to pointer 66. The arrangement provides for the necessary paralleling of rocking shaft torques generated by the capsules as they expand or contract with pressure changes. As is known in the art, pointer 66 moves in front of stationary dial 64, and gear mechanism 60 operates counter 49.

Each rocking shaft must be separately calibrated with the other one disconnected. Then both are connected to achieve a calibration which is approximately the average value of the two individual calibrations. If the two sides do not track each other, there is extra load on the sector gears 40a, 40b and pinion gear 42, thus adding friction. The main advantage of the system of FIGS. 2A and 2B is that it is inherently balanced and therefore insensitive to acceleration forces.

The basic difference between the system of my invention (FIGS. 3A and 3B) and that of FIGS. 2A and 2B is that I provide the capsules (at least one, but preferably at least two welded together) with rigidly attached centerpiece assemblies 70a, 72a and 70b, 72b extending in opposite directions. The capsule assembly is supported only at the ends of its rigid centerpieces or links by clevis joints 33a and 33b located at the link-lever arm junctions. The capsule arrangement "floats" since no capsule is attached to the instrument frame. Centerpiece 72a and 72b can have their effective lengths adjusted by rotating internally threaded elements 70a and 70b (after loosening lock nuts, not shown); the centerpieces cannot pivot relative to the capsules—clevis joints 25a and 25b (FIGS. 2A and 2B) are not provided. The clevis joints 33a and 33b prevent axial rotation of the capsule assembly, but permit rotation with very low friction around the clevis pins. No added friction due to the two mechanisms not tracking can occur.

Systems such as that shown in FIGS. 2A and 2B often have their sector gears loaded against each other by a few teeth in order to remove backlash from the sector-pinion mesh. This is not possible with the floating capsule arrangement of my invention. Backlash is eliminated by providing a conventional hairspring 75 secured to fixed post 76 on one of the subsequent gear stages.

The coventional gearing from the rocking shafts to the display, which in an altimeter ordinarily consists of a pointer which makes one revolution for each 1,000 feet of pressure altitude, and additional pointers, drums and/or counters which display thousands of feet, has some inherent friction which must be overcome by the capsules when they expand or contract. To give an accurate, smooth running pointer motion, the greatest possible capsule torque and low friction are desirable. Vibration, either generated by the environment where the altimeter is mounted, or by an electrical vibrator integral with the mechanism (not shown), may be used to minimize friction. However, more torque transmitted from the capsules to the rocking shafts is always desirable as it results in a smoother running instrument and greater accuracy since vibration cannot remove all of the friction.

As is apparent from FIGS. 3A and 3B, the capsule expansion or contraction forces are always directed axially on the capsules and the connected links resulting in all of their efforts being effective in producing rocking shaft torques. In prior art designs, as illustrated in FIGS. 2A and 2B, the forces on links 24a and 24b have lateral components which deflect the respective capsules laterally in the presence of a friction load on the gear train. This lateral resiliance and consequent deflection results in a loss of torque on the rocking shafts of up to as much as 30 percent of the total torque otherwise available. Thus, as compared with prior art designs, the arrangement of FIGS. 3A and 3B provides substantially increased torque for the same-sized capsules.

In calibrating the mechanism of my invention, the centerpiece lengths 72a and 72b and the lever arm lengths 34a and 34b are adjusted. Practically, only one centerpiece need be adjustable, since use of unequal centerpiece lengths does not affect the calibration or balance. The lever arms are adjusted in length so that they are always close to equal lengths, for the sake of perfect balance. Unequal lengths of lever arms does not affect the resultant pointer torque, but does have a small effect on the resultant calibration curve and on balance. An additional advantage of the invention is that only one calibration must be performed instead of two as in the Angst design.

In some systems, it is necessary to compensate for the expansion of the capsules and other mechanism parts due to changes in ambient temperature by the use of bimetallic members which effectively lengthen or shorten lever or link lengths in response to temperature changes. As taught by Angst, each side is compensated to avoid having one side oppose the other due to differences in compensation. With my floating arrangement, only one such compensator is needed for the entire mechanism. (By proper choice of metals for the capsules, centerpiece, frame, etc., it may be possible to reduce temperature errors to an acceptably low level without a bimetallic compensating element, as will be appreciated by those skilled in the art.)

My invention features a "floating" capsule arrangement which significantly increases the torque developable from a conventional evacuated diaphragm. The invention virtually eliminates the lateral force component heretofore suffered in prior art devices that resulted in less efficient use of the forces generated by an evacuated capsule. Such lateral forces result when a pivoted link is coupled to a fixed capsule as disclosed, for example, in the aforementioned Angst patent, or as disclosed in E. P. Knapp U.S. Pat. No. 3,495,462, issued on Feb. 17, 1970 and entitled "Protective Linkage In Electrically And Pressure Actuated Instrument".

It is to be understood that the above-described embodiments are merely illustrative of the application of the principles of this invention. Numerous variations may be devised by those skilled in the art without departing from the spirit or scope of the invention.

What I claim is:

1. A pressure indicator comprising a frame, a pair of rocking shafts each mounted for rotation in said frame, indicating means, gear means coupled to both of said rocking shafts and to said indicating means for additively translating rotations of said rocking shafts into movement of said indicating means, at least one diaphragm capsule means, two links each rigidly secured at one end to a respective side of said at least one diaphragm capsule means, the two links being capable of axial motion as said at least one diaphragm capsule means expands and contracts but being incapable of pivotal motion relative to said at least one diaphragm capsule means, and means for pivotally coupling the other end of each of said two links to a respective one of said rocking shafts to apply torques thereto as said links move in their axial direction, said at least one diaphragm capsule means and said two links floating with no constraints other than those introduced by said pivotally coupling means.

2. A pressure indicator in accordance with claim 1 further including means for adjusting the length of at least one of said two links between said at least one diaphragm capsule means and the respective pivotally coupling means.

3. A pressure indicator in accordance with claim 1 wherein said at least one diaphragm capsule means includes at least two diaphragm capsules attached together to form a single unit having a common axis.

* * * * *